United States Patent
Jia et al.

(10) Patent No.: US 11,531,831 B2
(45) Date of Patent: Dec. 20, 2022

(54) MANAGING MACHINE LEARNING FEATURES

(71) Applicant: Meta Platforms, Inc., Menlo Park, CA (US)

(72) Inventors: Hongzhong Jia, Cupertino, CA (US); Jay Parikh, Redwood City, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 620 days.

(21) Appl. No.: 16/587,713

(22) Filed: Sep. 30, 2019

(65) Prior Publication Data

US 2021/0097329 A1  Apr. 1, 2021

(51) Int. Cl.
*G06N 20/00* (2019.01)
*G06K 9/62* (2022.01)
*G06N 5/04* (2006.01)

(52) U.S. Cl.
CPC .......... *G06K 9/623* (2013.01); *G06K 9/6232* (2013.01); *G06K 9/6256* (2013.01); *G06N 5/04* (2013.01); *G06N 20/00* (2019.01)

(58) Field of Classification Search
CPC .......... G06N 3/08; G06N 3/082; G06N 20/00; G06F 9/50; G06F 9/5011; G06F 9/5016; G06K 9/6228; G06K 9/623; G06K 9/6232; G06K 9/6234; G06K 9/6256; G06V 10/771; G06V 10/7715; G06V 10/774; G06T 2207/20081; G06T 2207/20084

See application file for complete search history.

(56) References Cited

U.S. PATENT DOCUMENTS

| | | | |
|---|---|---|---|
| 2016/0092786 A1* | 3/2016 | Mehanna et al. | G06N 20/00 706/11 |
| 2020/0279140 A1* | 9/2020 | Pai et al. | G06F 11/3072 |
| 2020/0394542 A1* | 12/2020 | Buesser et al. | G06F 40/279 |
| 2021/0097424 A1* | 4/2021 | Kang et al. | G06N 20/00 |
| 2021/0125108 A1* | 4/2021 | Metzler, Jr. et al. | G06F 16/93 |

OTHER PUBLICATIONS

Juncheng Gu et al.: "Tiresias: A GPIU Cluster Manager for Distributed Deep Learning", USENIX, USENIX, The Advanced Computing Systems Association, Feb. 26, 2019, pp. 492-507.
Y. Peng et al., "Optimus: an efficient dynamic resource scheduler for deep learning clusters", EUROSYS '18: Proceedings of the Thirteenth EUROSYS Conference; Apr. 23-36, 2018; Porto, Portugal; Apr. 23, 2018. pp. 1-14.
Shijian Li et al., "Speeding up Deep Learning with Transient Servers", arxiv.org, Cornell University Library, 201 Olin Library Cornell University Ithaca, NY 14853, Feb. 28, 2019.
Wencong Xiao et al., "Gandiva: Introspective Cluster Scheduling for Deep Learning", USENIX, USENIX, The Advanced Computing Systems Association, Oct. 8, 2018, pp. 602-617.
Extended European Search Report for European Application No. 20196244.6, dated Mar. 23, 2021, 08 Pages.

* cited by examiner

*Primary Examiner* — Andrew W Johns
(74) *Attorney, Agent, or Firm* — Van Pelt, Yi & James LLP (57) ABSTRACT

A machine learning model is trained. A feature importance metric is determined for each machine learning feature of a plurality of machine learning features of the machine learning model. Based on the feature importance metrics, one or more machine learning features of the plurality of machine learning features of the machine learning model are managed.

20 Claims, 5 Drawing Sheets

MANAGING MACHINE LEARNING FEATURES

BACKGROUND OF THE INVENTION

Machine learning allows predictions and decisions to be based on patterns automatically learned from training data. The accuracy of a machine learning model built using training data is heavy influenced by the kind and amount of training data available. Aspects of training data utilized as inputs to build models are often referred to as machine learning features of the model. In an attempt to increase accuracy, there has been a push to increase the number of features utilized in a model. It is not uncommon to find models that have tens or hundreds of thousands of features. However, as the number of features is increased, so does the amount of storage and processing required to train and utilize the model. Thus, the efficiency, stability and reliability of the training all become hard to manage.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although an increase in the number of machine learning features often leads to an improvement in a performance of a machine learning model, the improvement in performance due to a new feature may be too small to justify the costs of associated collection, training, and processing. Worse, it may even have an opposite effect with feature overfitting.

In some embodiments, a machine learning model is trained. For example, using collected data corresponding to features of the machine learning model, the machine learning model is trained. An importance metric for each machine learning feature of a plurality of machine learning features of the machine learning model is determined. For example, features are evaluated during the machine learning training process to determine whether there is a correlation between a value of the feature and a performance of the model. Based on the importance metrics, one or more machine learning features of the plurality of machine learning features of the machine learning model are managed. For example, if it is determined that a feature has insufficient correlation to model accuracy, the feature is to be removed. This automatically causes the data of this feature to be no longer collected and this feature is removed when the model is retrained. This allows a more computationally efficient model to be generated (e.g., less processing and storage required to deploy the model) as well as to reduce the amount of data required to be collected and stored. In various embodiments, management of the features may take in to consideration importance metrics for machine learning features of a plurality of different machine learning models and the sharing of features across different machine learning models. For example, although a feature is not important for one model but important for another model, the feature may be retained.

Figure 1:
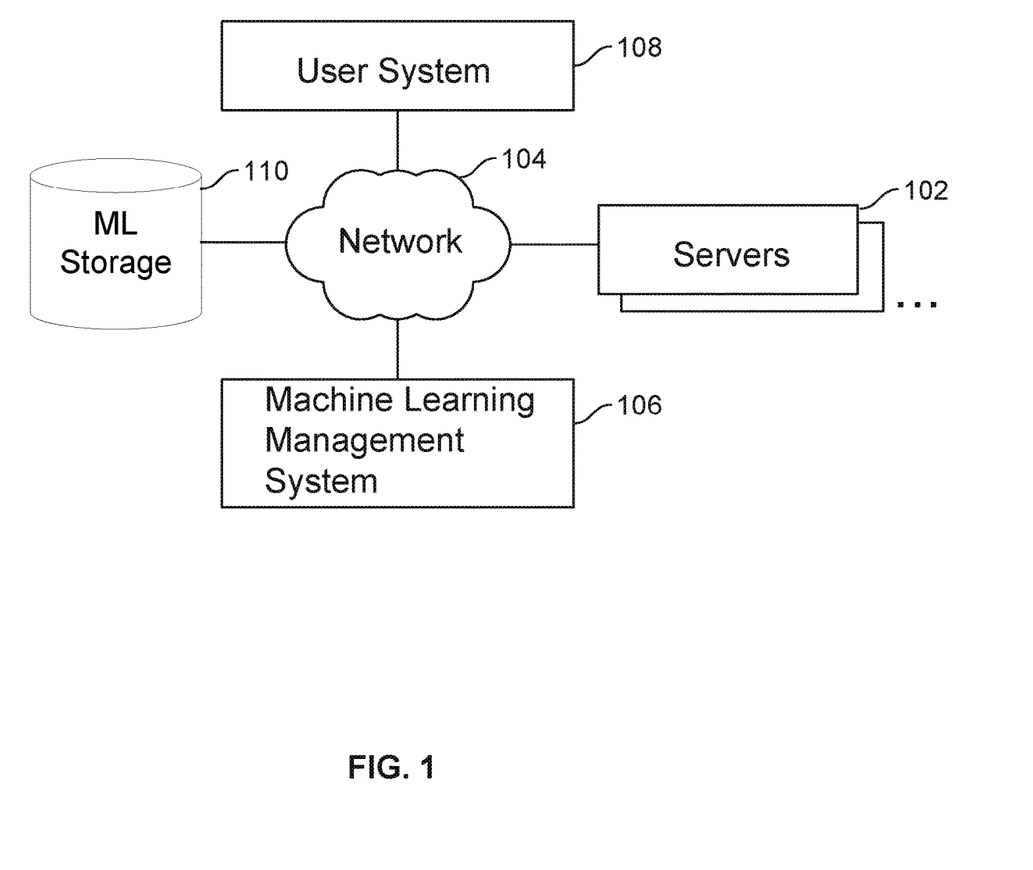
FIG. 1 is a block diagram illustrating an embodiment of a system environment for managing machine learning features.

FIG. 1 is a block diagram illustrating an embodiment of a system environment for managing machine learning features.

Servers 102 may include one or more compute, storage, web, application, and/or other processing servers. Servers 102 may be located in one or more different data centers. Servers 102 can be instructed to collect training data, perform machine learning training, and/or perform inference using trained machine learning models. At least a portion of processing work performed by servers 102 may include hosting and/or performing processing associated with end-user requests (e.g., for a social networking service to provide requested data/content to a webpage or an application of an end-user). In some embodiments, some of servers 102 are utilized for machine learning during times of low traffic or when underutilized. For example, some of servers 102 are temporarily repurposed to handle machine leaning training. If these servers are needed again to handle end-user request associated processing, one or more of these servers can be returned back to the pool of available servers.

In some embodiments, after or during the machine learning process of a machine learning model, server 102 determines a measure of importance of one or more machine learning features of the model. For example, features are evaluated during the machine learning training process to determine whether there is a correlation between a value of the feature and a performance of the model. The measures of importance may be provided to machine learning management system 106.

Machine learning management system 106 includes one or more servers/computers configured to orchestrate and manage machine learning and machine learning features. For example, machine learning management system 106 initiates machine learning training on selected ones of servers 102. Machine learning management system 106 may also manage machine learning features. For example, machine learning management system 106 manages which and amount of data that is collected for machine learning training as well as which machine learning features are utilized by various machine learning models. In one example, if it is determined that a feature has insufficient correlation to model accuracy, the feature is to be removed from the model and data of the feature is to be no longer collected. In various embodiments, management of the features may take in to consideration importance metrics for machine learning features of a plurality of different machine learning models and the sharing of features across different machine learning models. For example, although a feature is not important for one model but important for another model, the feature may be retained.

In some embodiments, machine learning storage 110 stores a repository of machine learning models and associated data. For example, training progress, training data, training states, parameters, metadata, results, the resulting model, and/or other associated information is stored for each performed machine learning model building/training. This repository is searchable and allows a user to identify machine learning models matching a search query. In some embodiments, machine learning storage 110 stores data associated with machine learning features of machine learning models. For example, a list of features and associated metrics (e.g., a measure of importance of each feature) are stored for various machine learning models. Machine learning management system 106 can use data from storage 110 to manage features of various machine learning models.

In some embodiments, user system 108 is utilized by a user to access services provided by one or more of servers 102. For example, a social networking service provided by servers 102 is accessed by a user using user system 108. Server 102 may also perform inference using one or more trained machine learning models to provide a service accessed by a user via user system 108. Examples of user system 108 include a personal computer, a laptop computer, a tablet computer, a mobile device, a display device, a user input device, and any other computing device.

Although limited number of instances of components have been shown to simplify the diagram, additional instances of any of the components shown in FIG. 1 may exist. Components not shown in FIG. 1 may also exist. The components shown communicate with each other via network 104. Examples of network 104 include one or more of the following: a direct or indirect physical communication connection, mobile communication network, Internet, intranet, Local Area Network, Wide Area Network, Storage Area Network, and any other form of connecting two or more systems, components, or storage devices together.

Figure 2:
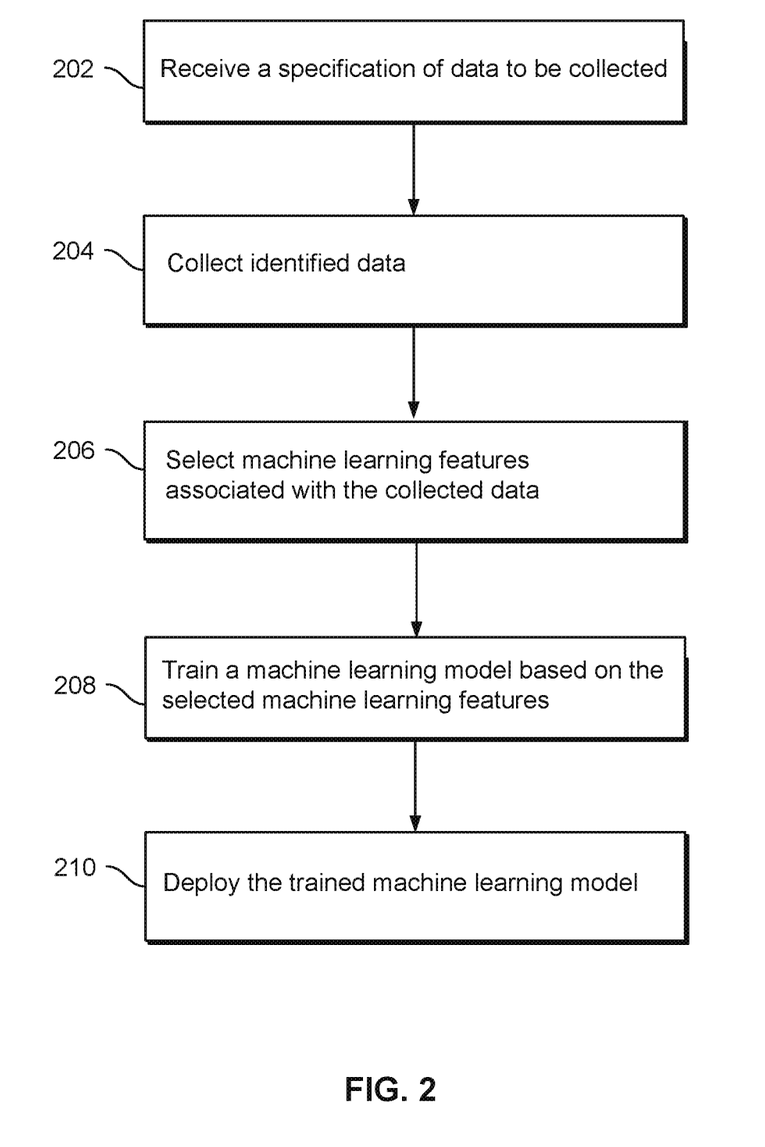
FIG. 2 is a flowchart illustrating an embodiment of a process for training and deploying a machine learning model.

FIG. 2 is a flowchart illustrating an embodiment of a process for training and deploying a machine learning model. The process of FIG. 2 may be at least in part implemented on one or more of server 102 and/or machine learning management system 106.

At 202, a specification of data to be collected is received. In some embodiments, types and amounts of data to be logged/stored are specified. For example, among vast and almost endless amounts of data that can be stored in association with a digital service being offered, a specification of data (e.g., which data, when to capture data, amount of data to be captured, retention period of data, etc.) to be captured (e.g., captured by servers 102 of FIG. 1) and stored (e.g., stored in a storage of servers 102 or storage 110) is received. In some embodiments, at least a portion of the collected data is to be utilized to train a machine learning model, and identification of data to be collected specifies training data needed to train a machine learning model. For example, a specification of a machine learning model desired to be trained is received and the specification identifies the training data to be utilized to train the machine learning model. Using this specification, the data to be collected to produce the desired training data is automatically identified. Because collecting, processing, and storing data can consume a large amount of storage and computing resources, it is desirable to collect only the data that will be useful. If needs or requirements change, it is desirable to be able to dynamically modify the data to be collected. By being able to specify the data to be collected, it provides dynamic control over data collection in a manner that allows efficiency and optimization of computer resource utilization.

At 204, the specified data is collected. Collecting the specified data includes logging/storing data identified in 202. For example, when data that is to be collected is detected, provided, and/or generated (e.g., during utilization of a social networking service by an end user), the data is stored in a storage. The collected data can be labeled and/or organized in a manner that allows efficient identification and retrieval for later use (e.g., to train a machine learning model). In some embodiments, the data is collected by one or more production servers (e.g., one or more of servers 102 of FIG. 1) that provide and/or perform processing associated with services accessed by an end user.

At 206, machine learning features are selected for a machine learning model to be trained. Each machine learning feature is a property, characteristic, data component, variable, or attribute that the machine learning model is based on. For example, machine learning features in training data serve as aspects of the training data utilized to train the machine learning model and the machine learning features of production data serve as inputs to the production deployed machine learning model. In one example, in a table of training data with rows representing each data record and columns representing different data fields of the data records, the selected columns to be utilized as inputs to train the machine learning model are the machine learning features of the model. Performing the machine learning feature selection may include receiving a specification of the machine learning features to be utilized for the machine learning model specified to be trained. These machine learning features are aspects of the data collected in 204 to be utilized to train the machine learning model. For example, the machine learning features are selected (e.g., automatically selected and/or manually selected) among available features of data collected in 204. In some embodiments, the received specification of the data to be collected is based at least in part on identified machine learning features of one or more machine learning models to be trained.

In some embodiments, at least one of the selected machine learning features is labeled as a generated machine learning feature, and/or at least one of the selected machine learning features is labeled as a base machine learning feature. A base machine learning feature is directly obtainable in collected data and/or provided training data (e.g., at least a portion of data collected in 204), and a generated machine learning feature is generated based on one or more base machine learning features or another generated machine learning feature. For example, a value of a base machine learning feature is processed, modified, and/or combined with another feature to generate a generated machine learning feature. It may be important to label which feature is a base machine learning feature and which feature is a generated machine learning feature to inform future data collection decisions. For example, if a base machine learning feature is to be no longer utilized in a future model, the data of the base machine learning feature can be identified as no longer to be collected if no other generated machine learning feature being utilized is based on the base machine learning feature. However, if a generated machine learning feature is to be no longer utilized in a future model, associated base machine learning features can be identified and individually analyzed to determine whether it still needs to be collected (e.g., a base machine learning feature can be identified as no longer to be collected if it is not being directly utilized and no other generated machine learning feature is based on it).

At 208, a machine learning model is trained based on the selected machine learning features. For example, portions of training data corresponding to the selected machine learning features are utilized to train the machine learning model (e.g., train a convolutional neural network). In some embodiments, the machine learning model is trained using one or more of servers 102 of FIG. 1.

In some embodiments, during the training process, one or more of the selected features are evaluated to determine an importance of each of the features. For example, an importance metric that identifies a measure of contribution of the feature to an accuracy/performance of the machine learning model is calculated for each of one or more of the machine learning features. Using this evaluation, the features of one or more machine learning models can be managed. For example, less important features can be dropped and the machine learning model can be retrained without the dropped features and the data of the dropped features can be identified as no longer to be collected. This allows a more computationally efficient model to be generated (e.g., less processing and storage required to deploy the model) as well as reduces the amount of data required to be collected and stored. In various embodiments, management of the features may take in to consideration importance metrics for machine learning features across a plurality of different machine learning models. For example, although a feature is not important for one model but important for another model, the feature may be retained.

At 210, the trained machine learning model is deployed. For example, the trained machine learning model is deployed for production use in servers to perform inference work associated with a service (e.g., social networking service) provided to end users. Additional training data can be collected during deployment and utilized to retrain the machine learning model. For example, the process of FIG. 2 can be repeated. During the subsequent iteration of the process of FIG. 2, the specification of data to be collected in 202 may be modified based on importance of the machine learning features determined in 208 during model training. For example, machine learning features determined to not meet a threshold of importance are to be no longer utilized and data of these dropped features is no longer identified as to be collected.

Figure 3:
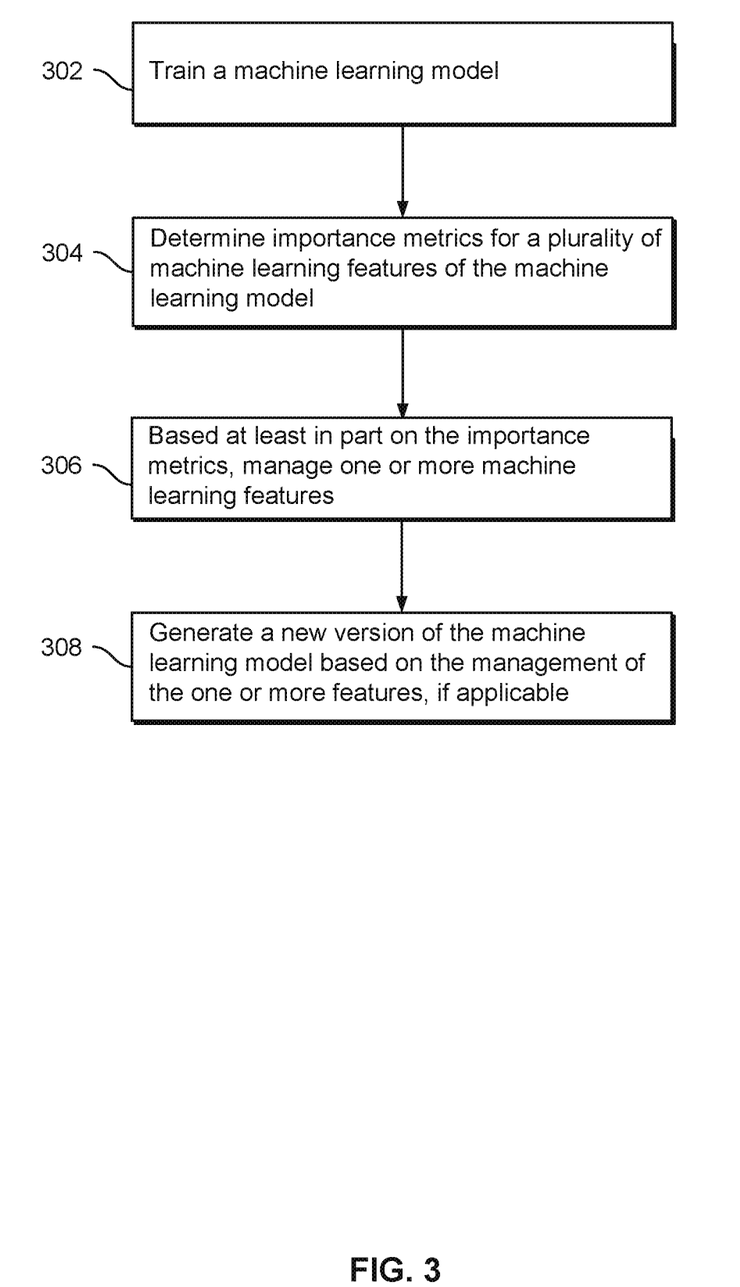
FIG. 3 is a flowchart illustrating an embodiment of a process for training a machine learning model and managing its features.

FIG. 3 is a flowchart illustrating an embodiment of a process for training a machine learning model and managing its features. The process of FIG. 3 may be at least in part implemented on one or more of server 102 and/or machine learning management system 106. In some embodiments, at least a portion of the process of FIG. 3 is included in 208 of FIG. 2.

At 302, a machine learning model is trained. In some embodiments, the machine learning model is the machine learning model trained in 208 of FIG. 2 based on the selected machine learning features. For example, portions of training data corresponding to the selected machine learning features are utilized to train the machine learning model. In some embodiments, the machine learning model is trained using one or more of servers 102 of FIG. 1.

At 304, importance metrics for a plurality of machine learning features of the machine learning model are determined. Each of the importance metrics may include a value that indicates an importance of the corresponding machine learning feature. For example, an importance metric value that is a measure of contribution of the feature to an accuracy/performance of the machine learning model is calculated for each machine learning feature of the model. In some embodiments, determining the importance metrics includes determining a relative importance between the machine learning features of the model. For example, a ranked list of features based on their importance to a result of the model is determined.

An importance metric of a specific feature may be determined by comparing (e.g., determine a difference between) a base performance of the model for a test dataset with a new performance of the model for a modified version of the test dataset with alternated values for the specified feature (e.g., flipped value, randomized value, zero value, removed value, etc.). If the difference in performance is large and worse for the modified performance test dataset than the original performance test dataset, the specific feature is important; whereas if the difference in performance is small or better for the modified performance test dataset than the original performance test dataset, the specific feature is not as important. Because feature importance evaluation can be a very computationally expensive process, the test dataset may be selected to be limited in size to reduce the compute cost for feature importance evaluation and at the same time, retain the feature importance evaluation accuracy. For example, based on amount of test dataset available, only a portion of the all available test dataset meeting a size/amount criteria is selected for use in feature importance evaluation (e.g., only utilize the last N day of data, only load x % of the data, etc.).

At 306, based at least in part on the importance metrics, one or more machine learning features are managed.

In various embodiments, managing a machine learning feature includes performing one or more of the following: removing/dropping the feature from the model, modifying the feature, deleing data corresponding to the feature, causing data corresponding to the feature to be no longer collected, selecting a storage tier for data corresponding to the feature, or generating a new feature based on the managed feature. For example, if an importance metric of a machine learning feature is below a threshold value, the machine learning feature is to be removed from the model (e.g., model retrained to remove feature) and existing collected data corresponding to the machine learning feature is automatically deleted and future data corresponding to the machine learning feature is automatically no longer collected (e.g., specified as no longer to be collected in 202 of FIG. 2). This threshold value may be dynamically determined based on one or more of the following: importance metrics of other features (e.g., based on average value), total number of other features, amount of storage utilized to store feature data, amount of storage resources available, amount of processing resources available, or an importance (e.g., ranking, category, etc.) of the machine learning model utilizing the feature. In another example, if an importance metric of a machine learning feature is below a threshold value, the machine learning feature is modified or transformed in an attempt to produce a version of the feature to improve a performance of the model (e.g., model retrained using modified feature). In another example, if an importance metric of a machine learning feature is above a threshold value, the machine learning feature is used to generate a new feature (e.g., combined with other machine learning features to generate the new feature that is used to retrain the model).

In some embodiments, a storage tier of stored data corresponding to a machine learning feature is determined based on its importance metric. For example, data corresponding to a feature with an importance metric within a first value range (e.g., high importance) is stored in a high performance storage (e.g., solid state drive); data corresponding to a feature with an importance metric within a second value range (e.g., medium importance) is stored in a medium performance storage (e.g., hard disk drive); and data corresponding to a feature with an importance metric within a third value range (e.g., low importance) is stored in a low performance storage (e.g., cold storage).

In various embodiments, management of the features may take into consideration importance metrics for other machine learning features of a plurality of different machine learning models. For example, if a feature is not important for one model but important for another model that uses the same feature, the feature and/or its data may be retained.

At 308, a new version of the machine learning model is generated based on the management of the one or more machine learning features, if applicable. For example, if management of the features in 306 has caused a machine learning feature to be removed, the new version of the machine learning model is generated/retrained with training data that does not include the removed feature to generate the new version. Thus, less important features can be dropped and the machine learning model can be retrained without the dropped features, allowing the collected data of the dropped features to be deleted and future associated data to be no longer collected and stored. This allows a more computationally efficient model to be generated (e.g., less processing and storage required to deploy the model) as well as reduces the amount of data required to be collected and stored. In another example, if management of the features in 306 has caused a machine learning feature to be added, transformed, or modified, the new version of the machine learning model is generated/retrained with training data that includes the new/transformed/modified feature. With this new/transformed/modified feature(s), the new version of the machine learning model may perform more efficiently and/or be more accurate.

Figure 4:
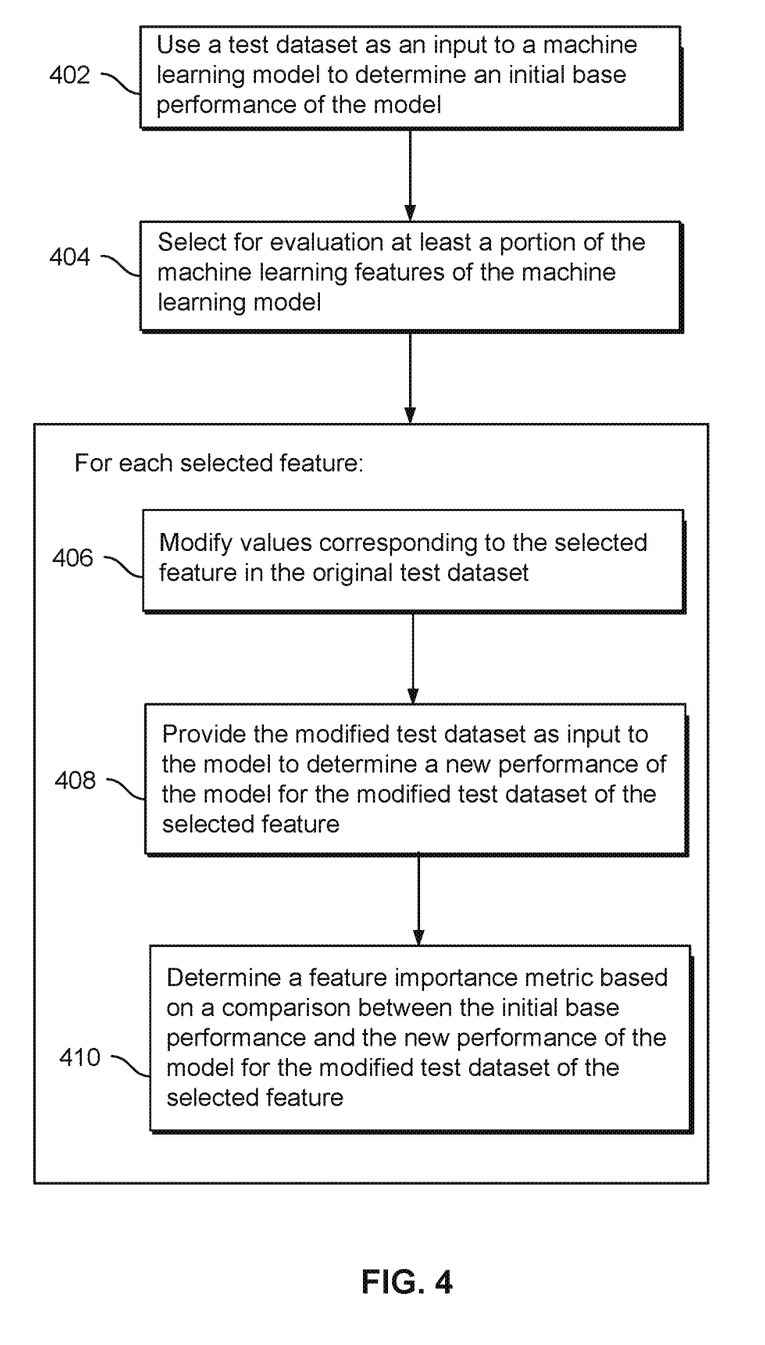
FIG. 4 is a flowchart illustrating an embodiment of a process for determining a feature importance metric.

FIG. 4 is a flowchart illustrating an embodiment of a process for determining a feature importance metric. The process of FIG. 4 may be at least in part implemented on one or more of server 102 and/or machine learning management system 106. In some embodiments, at least a portion of the process of FIG. 4 is included in 208 of FIG. 2 and/or 304 of FIG. 3.

At 402, a test dataset is provided as an input to a machine learning model to determine an initial base performance of the model. Because feature importance evaluation can be a very computationally expensive process, the test dataset may be selected to be limited in size to reduce the compute cost for feature importance evaluation and at the same time, retain the feature importance evaluation accuracy. For example, based on amount of test dataset available, only a portion of the all available test dataset meeting a size/amount criteria is selected for use in feature importance evaluation (e.g., only utilize the last N day of data, only load x % of the data, etc.). In some embodiments, the machine learning model is the model trained in 208 of FIG. 2 and/or in 302 of FIG. 3. For example, the machine learning model that has been trained is to be analyzed to determine relative importance of features of the model. In order to establish an initial baseline performance, each entry of the test dataset is provided as an input to the model and a corresponding inference result of the model is compared with a corresponding known correct result to determine an accuracy/performance metric of the model result (e.g., accuracy percentage identifying closeness of the model result with the corresponding known correct result). In some embodiments, a statistical measure (e.g., average value) of the model accuracy across a plurality of entries of the test dataset is calculated as the initial base performance of the model.

At 404, a least a portion of the machine learning features of the model to be evaluated are selected. For example, each feature of the model is to be evaluated and each feature is selected one by one for evaluation until all features have been evaluated for the model. In some embodiments, only a portion of the features of the model are to be evaluated. For example, features identified as corresponding to a stored data size above a threshold total size are selected for evaluation (e.g., only test features that require a large amount of storage to store). In another example, features for evaluation are selected randomly (e.g., spot check features since evaluating all features may consume too many computing resources).

Steps 406-410 are repeated for each selected feature.

At 406, values corresponding to the selected feature in the original test dataset are modified. For example, values in the original test dataset corresponding to the selected feature (e.g., column of values corresponding to the selected feature) are modified to create a modified test dataset. Modifying the values includes replacing the values with one or more of the following: randomly generated values, zero values, flipped values, removed value, or any other changed/modified values. The degree to which accuracy of the model is affected by changes to the features may indicate the importance and contribution of the feature to the accuracy of the model. The compute costs for these different ways of modifying the test dataset are different with various accuracy trade-offs. In various machine learning use cases, a certain test dataset modification approach among the many approaches may be selected based on a property of the model (e.g., based on model type, model use case, accuracy requirements, etc.). For example, for medical machine learning use cases where a high result accuracy is desired, a test dataset modification approach with high-quality feature importance evaluation is selected (e.g., randomized values utilized rather than just removing values from the test dataset).

At 408, the modified test dataset is provided as input to the machine learning model to determine a new performance of the machine learning model for the modified test dataset of the selected feature. Each entry of the modified test dataset is provided as an input to the model and a corresponding inference result of the model is compared with a corresponding known correct result to determine an accuracy/performance metric of the model result (e.g., accuracy percentage identifying closeness of the model result with the corresponding known correct result). In some embodiments, a statistical measure (e.g., average value) of the model accuracy across a plurality of entries of the modified test dataset is calculated as the new performance of the model for the modified test dataset of the selected feature.

At 410, a feature importance metric is determined based on a comparison between the initial base performance and the new performance of the model for the modified test dataset of the selected feature. In some embodiments, the feature importance metric is calculated at least in part by calculating a difference between the initial base performance and the new performance of the model for the modified test dataset of the selected feature. A larger difference indicates a larger importance/contribution of the feature to the result of the model, and a smaller difference indicates a smaller importance/contribution of the feature to the result of the model. In one example, the feature importance metric is the raw difference value. In another example, the feature importance metric is a percentage change value (e.g., percentage change between the initial base performance and the modified performance of the machine learning model for the selected feature). In another example, the feature importance metric is a ranking order place value. The ranking order place value of each selected feature may be determined by determining each magnitude of difference between the initial base performance and the new performance of the model for the modified test dataset of each selected feature, and identifying a ranking order place of the selected feature when all of the differences of the selected features are ranked from largest to smallest magnitude.

In some embodiments, if the new performance of the model for the modified test dataset of the selected feature is better than the initial base performance, the feature importance metric is set to a value (e.g., zero value) corresponding to a low feature importance. For example, if the value representing the initial base performance minus the value representing the new performance of the model for the modified test dataset of the selected feature is a negative number, the feature importance metric is set as a zero value (e.g., a larger feature importance metric value indicates a larger importance).

Figure 5:
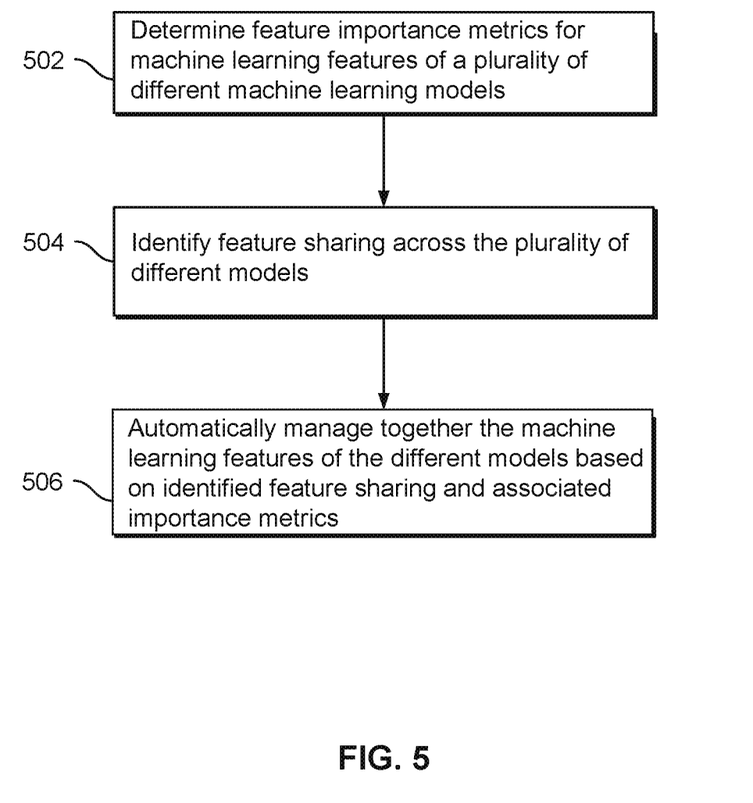
FIG. 5 is a flowchart illustrating an embodiment of a process for automatically managing machine learning features.

FIG. 5 is a flowchart illustrating an embodiment of a process for automatically managing machine learning features. The process of FIG. 5 may be at least in part implemented on one or more of server 102 and/or machine learning management system 106. In some embodiments, at least a portion of the process of FIG. 5 is included in 208 of FIG. 2 and/or 306 of FIG. 3.

At 502, feature importance metrics are determined for machine learning features of a plurality of different machine learning models. For example, for each different machine learning model of the plurality of different machine learning models sharing the same storage and/or computing resources, the process of FIG. 4 is performed to determine feature importance metrics of each machine learning model. These different feature importance metrics for various different models can be collected and stored in a central repository (e.g., in a storage of management system 106 and/or storage 110 of FIG. 1).

In some embodiments, feature importance metrics are determined for only a selected portion of machine learning features of the plurality of different machine learning models. For example, features identified as corresponding to a stored data size above a threshold total size are selected for evaluation (e.g., only test features that require a large amount of storage to store). In another example, features for evaluation are selected randomly (e.g., spot check features since evaluating all features may consume too many computing resources).

At 504, feature sharing across the plurality of different models is identified. For example, in order to manage features and corresponding data of the features of machine learning models supported by a system, it is desirable to know where features and their data are utilized across all of the different machine learning models because the models share the same pool of storage and/or processing resources. In some embodiments, for each unique feature, a list of models that utilize the specific feature (e.g., utilize collected/stored data of the feature) and associated feature importance metrics of the specific feature for each model that utilizes it are identified. For example, a repository that stores information about features of the models is searched to identify the models that utilize each feature.

At 506, the machine learning features of the different machine learning models are managed together based on identified feature sharing and the associated importance metrics. For example, rather than managing features on an individual level independently for each machine learning model, the features are managed together across a plurality of different machine learning models that share the same pool of storage and/or computing resources. In various embodiments, each managing machine learning feature includes performing one or more of the following: removing/dropping the feature from one or more models, modifying the feature, deleting data corresponding to the feature, causing data corresponding to the feature to be no longer collected, selecting a storage tier for data corresponding to the feature, or generating a new feature based on the managed feature. In some embodiments, a feature lineage graph is generated in determining the super set of important features for the different machine models. The features which are not in this super set may be removed, resulting in associated data of the removed features being no longer logged and no longer sent for storage to the back end storage tier.

In an example, if an importance metric of a certain machine learning feature for a certain model is below a certain threshold value, the certain machine learning feature is to be removed from the model (e.g., model retrained to remove feature). However, data of the certain feature may not be able to be deleted because the data of the certain feature may still be used by another model. Existing data corresponding to the certain machine learning feature is automatically deleted and future data corresponding to the certain machine learning feature is automatically no longer collected only if no other model is to utilize data of the feature.

In some embodiments, a storage tier of data corresponding to a machine learning feature is determined based on its importance metrics across all of the models that utilize it (e.g., determine an overall importance metric by adding together feature importance metric(s) of the feature for different model(s), selecting highest feature importance metric among the different feature importance metric(s) for the feature, averaging the different feature importance metric(s) for the feature, etc.). For example, data corresponding to a feature with an overall importance metric within a first value range (e.g., high importance) is stored in a high performance storage (e.g., solid state drive); data corresponding to a feature with an overall importance metric within a second value range (e.g., medium importance) is stored in a medium performance storage (e.g., hard disk drive); and data corresponding to a feature with an overall importance metric within a third value range (e.g., low importance) is stored in a low performance storage (e.g., cold storage).

In some embodiments, relative importance between the features across the different models are determined based on the identified sharing of features and the associated importance metrics. For example, for each unique feature, an overall importance metric is determined by calculating a statistical measure of the different feature importance metrics for the same feature utilized by any of the different models (e.g., add together the different feature importance metrics, select highest feature importance metric among the different feature importance metrics, average the different feature importance metrics, etc.). Then the overall feature importance metrics can be ranked and sorted to identify a list of unique features ranked by their relative importance (e.g., amount of contribution to result of model(s)). In some embodiments, the overall importance metrics and/or rankings take into consideration an importance category of the model(s) that use the corresponding feature and amount of storage/resources utilized to store data of the corresponding feature. If additional storage and/or processing resources are needed, the features on the bottom of the list can be selected for removal from all models and the corresponding data to the removed features can be deleted and no longer collected.

In some embodiments, if the overall importance metric for a feature is below a threshold value, the machine learning feature is to be removed from all of the models (e.g., models retrained to remove feature) and existing data corresponding to the machine learning feature is automatically deleted and future data corresponding to the machine learning feature is automatically no longer collected. This threshold value may be dynamically determined based on one or more of the following: overall importance metrics of other features across the different models, total number of other features across the different models, amount of storage utilized to store feature data, amount of storage resources available, amount of processing resources available, or an importance (e.g., ranking, category, etc.) of the different machine learning models utilizing the feature.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    training a machine learning model;
    determining a feature importance metric for each machine learning feature of a plurality of machine learning features of the machine learning model; and
    based on the feature importance metrics, managing one or more machine learning features of the plurality of machine learning features of the machine learning model, wherein managing the one or more machine learning features of the machine learning model includes managing together machine learning features of a plurality of different machine learning models.

2. The method of claim 1, wherein managing the one or more machine learning features includes generating a new version of the machine learning model based on the feature importance metrics.

3. The method of claim 1, wherein managing the one or more machine learning features includes determining to remove one of the one or more machine learning features based on a determination that its associated feature importance metric does not meet a threshold value.

4. The method of claim 1, wherein managing the one or more machine learning features includes retraining the machine learning model to remove at least one of the one or more machine learning features from the machine learning model.

5. The method of claim 4, wherein managing the one or more machine learning features includes automatically deleting stored data of the at least one removed feature.

6. The method of claim 4, wherein managing the one or more machine learning features includes automatically causing data of the at least one removed feature to be no longer collected.

7. The method of claim 1, wherein managing the one or more machine learning features includes modifying at least one of the one or more machine learning features and retraining the machine learning model using the at least one modified feature of the one or more machine learning features.

8. The method of claim 1, wherein managing the one or more machine learning features includes generating a new feature based on at least one of the one or more machine learning features and retraining the machine learning model using the new feature.

9. The method of claim 1, wherein determining the feature importance metric for a selected one of the machine learning features includes comparing a base performance of the machine learning model for a selected test dataset with a new performance of the machine learning model for a modified version of the selected test dataset of the selected machine learning feature.

10. The method of claim 9, wherein the modified version of the selected test dataset of the selected machine learning feature is generated at least in part by modifying values corresponding to the selected machine learning feature using a modification approach selected based on a property of machine learning model.

11. The method of claim 9, wherein the modified version of the selected test dataset of the selected machine learning feature is generated at least in part by randomizing values corresponding to the selected machine learning feature.

12. The method of claim 1, wherein the each feature importance metric includes a numerical value representing an amount of contribution of the corresponding machine learning feature to an inference result of the machine learning model.

13. The method of claim 1, wherein the each feature importance metric includes a numerical value representing a rank order of the corresponding machine learning feature as compared to others of the machine learning features.

14. The method of claim 1, wherein managing together the machine learning features of the plurality of different machine learning models includes determining a ranking order of the machine learning features of the plurality of different machine learning models.

15. The method of claim 1, wherein managing together the machine learning features of the plurality of different machine learning models includes identifying feature sharing across a plurality of the different machine learning models.

16. The method of claim 15, wherein identifying the feature sharing across the plurality of the different machine learning models includes identifying a plurality of different feature importance metrics for a same shared feature.

17. The method of claim 15, wherein managing together machine learning features of the plurality of different machine learning models includes determining whether to remove a selected machine learning feature of one of the different machine learning models based on identified sharing of the selected machine learning feature among a plurality of the different machine learning models.

18. A system, comprising:
a processor configured to:
  train a machine learning model;
  determine a feature importance metric for each machine learning feature of a plurality of machine learning features of the machine learning model; and
  based on the feature importance metrics, manage one or more machine learning features of the plurality of machine learning features of the machine learning model, wherein being configured to manage the one or more machine learning features of the machine learning model includes being configured to manage together machine learning features of a plurality of different machine learning models; and
a memory coupled to the processor and configured to provide the processor with instructions.

19. The system of claim 18, wherein being configured to manage together the machine learning features of the plurality of different machine learning models includes being configured to identify feature sharing across a plurality of the different machine learning models.

20. A computer program product, the computer program product being embodied in a non-transitory computer readable storage medium and comprising computer instructions for:
training a machine learning model;
determining a feature importance metric for each machine learning feature of a plurality of machine learning features of the machine learning model; and
based on the feature importance metrics, managing one or more machine learning features of the plurality of machine learning features of the machine learning model, wherein managing the one or more machine learning features of the machine learning model includes managing together machine learning features of a plurality of different machine learning models.

* * * * *